щ
United States Patent
Xu et al.

(10) Patent No.: US 9,497,055 B2
(45) Date of Patent: Nov. 15, 2016

(54) METHOD AND APPARATUS FOR POLAR RECEIVER WITH DIGITAL DEMODULATION

(71) Applicant: Innophase Inc., Chicago, IL (US)

(72) Inventors: Yang Xu, Chicago, IL (US); Sara Munoz Hermoso, Chicago, IL (US);
(Continued)

(73) Assignee: INNOPHASE INC., San Diego, CA (US)

( * ) Notice: Subject to any disclaimer, the term of this patent is extended or adjusted under 35 U.S.C. 154(b) by 0 days.

(21) Appl. No.: 14/634,525

(22) Filed: Feb. 27, 2015

(65) Prior Publication Data
US 2016/0254934 A1 Sep. 1, 2016

(51) Int. Cl.
*H04L 27/00* (2006.01)
*G06F 3/033* (2013.01)
(Continued)

(52) U.S. Cl.
CPC .............. *H04L 27/22* (2013.01); *G01S 13/70* (2013.01); *H04B 1/06* (2013.01)

(58) Field of Classification Search
CPC ................. H04L 27/3863; H04L 1/206; H04L 27/2334; H04L 27/2338; H04L
(Continued)

(56) References Cited

U.S. PATENT DOCUMENTS

| | | | | |
|---|---|---|---|---|
| 4,271,412 A | * | 6/1981 | Glass | G01S 13/70 342/105 |
| 4,322,819 A | * | 3/1982 | Hyatt | B60R 16/0373 365/222 |

(Continued)

FOREIGN PATENT DOCUMENTS

| | | |
|---|---|---|
| JP | 07221570 | 8/1995 |
| JP | 11088064 | 3/1999 |

(Continued)

OTHER PUBLICATIONS

International Search Report and Written Opinion for PCT/US2014/026459 mailed Jul. 28, 2014.

(Continued)

*Primary Examiner* — Sarah Hassan
(74) *Attorney, Agent, or Firm* — Invention Mine LLC

(57) ABSTRACT

Circuitry and methods are described for digital signal demodulation. In a polar receiver, a modulated radio-frequency input signal is provided to frequency division circuitry, which may include a harmonic injection-locked oscillator (ILO). The phase of the frequency-divided output is measured using a self-triggered time-to-digital converter (TDC), which may be a Vernier TDC. A subtractor subtracts a period offset from the output of the TDC to generate an offset digital time output, and a digital integrator integrates the offset digital time output. The integrated time signal represents the phase of the radio-frequency input signal and can be used to determine a symbol, such as a phase-shift keying (PSK) or quadrature amplitude modulation (QAM) symbol, conveyed by the modulated radio-frequency input signal.

22 Claims, 4 Drawing Sheets

(72) Inventors: Roc Berenguer Perez, San Sebastian (ES)

(51) Int. Cl.
*H04L 27/22* (2006.01)
*H04B 1/06* (2006.01)
*G01S 13/70* (2006.01)

(58) Field of Classification Search
CPC ............... 27/368;H04L 27/3809; H04L 27/06; H04L 27/08; H04L 27/2636
USPC .......................................... 375/259; 455/130
See application file for complete search history.

(56) References Cited

U.S. PATENT DOCUMENTS

| | | | |
|---|---|---|---|
| 5,325,095 A * | 6/1994 | Vadnais | G01S 13/0209 342/129 |
| 5,493,581 A * | 2/1996 | Young | H03D 7/165 375/345 |
| 5,635,864 A * | 6/1997 | Jones | H03K 5/24 327/63 |
| 6,369,659 B1 | 4/2002 | Delzer | |
| 6,556,636 B1 | 4/2003 | Takagi | |
| 6,975,165 B2 | 12/2005 | Lopez Villegas | |
| 7,042,958 B2 | 5/2006 | Biedka | |
| 7,095,274 B2 | 8/2006 | Lopez Villegas | |
| 7,447,272 B2 | 11/2008 | Haglan | |
| 7,564,929 B2 | 7/2009 | Lopez Villegas | |
| 8,421,661 B1 * | 4/2013 | Jee et al. | 341/143 |
| 8,498,601 B2 | 7/2013 | Horng | |
| 8,666,325 B2 | 3/2014 | Knorr | |
| 8,854,091 B2 | 10/2014 | Hossain | |
| 9,083,588 B1 | 7/2015 | Xu | |
| 2001/0001616 A1 * | 5/2001 | Rakib | H03M 13/256 375/259 |
| 2002/0132597 A1 * | 9/2002 | Peterzell | H03D 3/008 455/130 |
| 2003/0053554 A1 * | 3/2003 | McCrokle | H04B 1/71632 375/295 |
| 2004/0036538 A1 | 2/2004 | Devries | |
| 2004/0100330 A1 | 5/2004 | Chandler | |
| 2005/0285541 A1 * | 12/2005 | LeChevalier | H01J 21/24 315/169.3 |
| 2008/0150645 A1 | 6/2008 | McCorquodale | |
| 2008/0192872 A1 * | 8/2008 | Lindoff | 375/355 |
| 2008/0220735 A1 | 9/2008 | Kim | |
| 2011/0050296 A1 | 3/2011 | Fagg | |
| 2011/0159877 A1 | 6/2011 | Kenington | |
| 2012/0074990 A1 | 3/2012 | Sornin | |
| 2012/0256693 A1 | 10/2012 | Raghunathan | |
| 2012/0306547 A1 | 12/2012 | Arora | |
| 2013/0257494 A1 * | 10/2013 | Nikaeen et al. | 327/156 |
| 2014/0023163 A1 | 1/2014 | Xu | |
| 2015/0207499 A1 | 7/2015 | Horng | |

FOREIGN PATENT DOCUMENTS

| | | |
|---|---|---|
| JP | 1187313 | 3/2002 |
| WO | 2012132847 | 4/2012 |

OTHER PUBLICATIONS

Henzler, S., "Time-to_Digital Converters", Springer Series in Advanced Microelectronics 29, DOI, 10.1007/978-90-481-8628-0_2, copyright Springer Science+Business Media B.V. 2010, Chapter 2, pp. 15 pages.

Lin, et al., "Single-Stage Vernier Time-to-Digital Converter with Sub-Gate Delay Time Resolution", Circuits and Systems, 2011, 2, 365-371, Oct. 2011.

Dudek, et al., "A High-Resolution CMOS Time-to-Digital Converter Utilizing a Vernier Delay Line", IEEE Transactions on Solid-State Circuits, vol. 35, No. 2, Feb. 2000.

Effendrik, P., "Time-to-Digital Converter (TDC) for WiMAX ADPLL in State-of-The-Art 40-nm CMOS", MSc Thesis, Apr. 18, 2011, 80 pages.

Nazari, et al., "Polar Quantizer for Wireless Receivers: Theory, Analysis, and CMOS Implementation", IEEE Transactions on Cricuits and Systems, vol. 61, No. 3, Mar. 2014.

Jovanovic, et al., "Vernier's Delay Line Time-to-Digital Converter", Scientific Publications of the State University of Novi Pazar, Ser. A: Appl. Math. Inform. and Mech., vol. 1, 1 (2009), pp. 11-20.

Jose Maria Lopez-Villegas et al., BPSK to ASK Signal Conversion Using Injection-Locked Oscillators-Part I: Theory, Dec. 2005, IEEE Transactions on Microwave Theory and Techniques, vol. 53, No. 12, available online at: http://diposit.ub.edu/dspace/bitstream/2445/8751/1/529612.pdf.

International Search Report for PCT/US2013/024159 mailed Apr. 9, 2013.

Chi-Tsan Chen, Cognitive Polar Receiver Using Two Injection-Locked Oscillator Stages, IEEE Transactions on Microwave Theory and Techniques, vol. 59, No. 12, Dec. 2011.

N. Siripon, et al., Novel Sub-Harmonic Injection-Locked Balanced Oscillator, Microwave and Systems Research Group (MSRG), School of Electronics, Computing and Mathematics, University of Surrey, Sep. 24, 2011, 31st European Microwave Conference.

Hamid R. Rategh, et al., Superharmonic Injection Locked Oscillators as Low Power Frequency Dividers, Stanford University, Stanford, California.

Behzad Razavi, A Study of Injection Pulling and Locking in Oscillators, Electrical Engineering Department, University of California, 2003, IEEE, Custom Integrated Circuits Conference.

Marc Tiebout, A 50GHz Direct Injection Locked Oscillator Topology as Low Power Frequency Divider in 0.13 µm CMOS, Infineon Technologies AG, Solid-State Circuits Conference, 2003, pp. 73-76, 29th European ESSCIRC.

Pei-Kang Tsai, et al., Wideband Injection-Locked Divide-by-3 Frequency Divider Design with Regenerative Second-Harmonic Feedback Technique, RF@CAD Laboratory, Department of Electrical Engineering, National Cheng Kung University, Tainan, Taiwan.

Chi-Tsan Chen et al., Wireless Polar Receiver Using Two Injection-Locked Oscillator Stages for Green Radios, IEEE MTT-S International, Jun. 2011.

International Search Report and Written Opinion for PCT/US2014/030525 mailed Jul. 24, 2014.

Aeroflex, Application Note, Measurement of Frequency Stability and Phase Noise, Feb. 2007, part No. 46891/865.

Hewlett Packard, Phase Noise Characterization of Microwave Oscillators, Frequency Discriminator Method, Sep. 1985, USA.

Paul O'Brien, A Comparison of Two Delay Line Discriminator Implementations Ireland.

Claude Frantz, Frequency Discriminator, published 1994.

International Search Report and Written Opinion for PCT/US2014/029055 mailed Sep. 15, 2014.

Electronic Warfare and Radar Systems Engineering Handbook, Mixers and Frequency Discriminators, Section 6-8.1 to 6-8.2, Apr. 1, 1999, Naval Air Systems Command and Naval Air Warfare Center, USA.

Putnam, William, and Julius Smith, "Design of fractional delay filters using convex optimization" (1997 IEEE ASSP Workshop on Applications of Signal Processing to Audio and Acoustics).

* cited by examiner

METHOD AND APPARATUS FOR POLAR RECEIVER WITH DIGITAL DEMODULATION

BACKGROUND

Communications transceivers may utilize numerous architectures to recover data from a modulated carrier signal. These architectures include coherent demodulation, using either intermediate frequency conversion or direct-conversion receivers. Such receivers typically recover or regenerate the communications carrier signal using a phase-locked loop (PLL) and coherent demodulation. Recently, polar receiver architectures have been proposed that extract the modulation phase components from a received modulation signal without using a carrier recovery circuitry. However, the proposed polar receiver architectures and associated signal processing have deficiencies that result in poor performance and high bit error rates (BER). Accordingly, there is a need for improved polar receiver signal processing and architectures.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
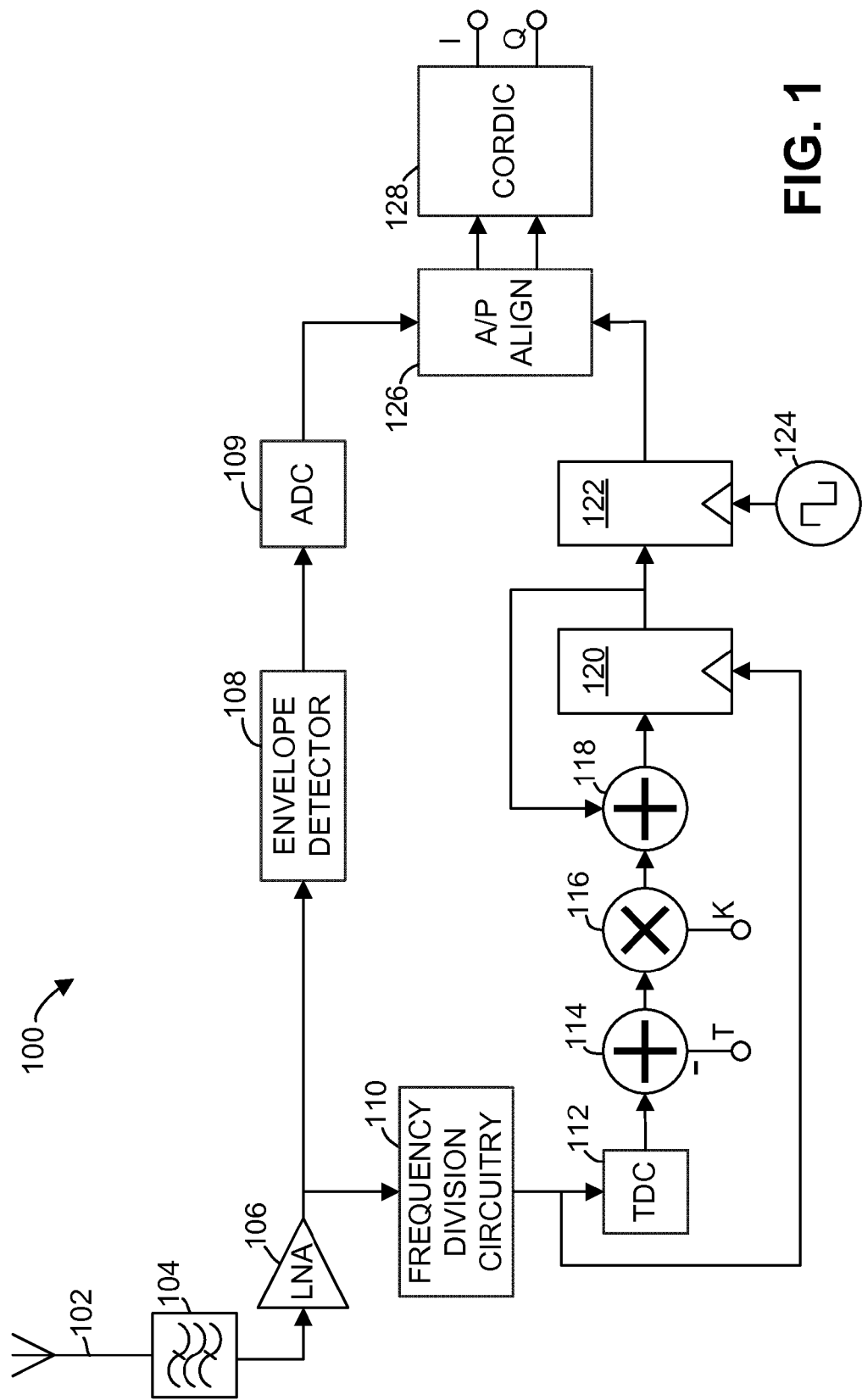
FIG. 1 is a block diagram of a polar receiver in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an exemplary embodiment illustrated in FIG. 1, a polar receiver 100 receives an incoming radio-frequency (RF) signal through an input node, such as antenna 102. In some embodiments, the incoming radio-frequency signal, also referred to herein as a modulated carrier signal, has a frequency in the range of 2412 MHz-2484 MHz, although the use of the polar receiver 100 is not limited to that frequency range. The incoming radio-frequency signal is filtered by a bandpass filter 104 and amplified by a low-noise amplifier (LNA) 106. The polar receiver 100 operates to receive and decode frequency modulated or phase-modulated radio-frequency signals, such as signals modulated using phase shift keying (PSK) or quadrature amplitude modulation (QAM). As the term is used in the present disclosure, phase-modulated signals include signals that are modulated in phase (e.g., binary phase-shift keying, quadrature phase-shift keying, 8-PSK, or 16-PSK) as well as signals that are modulated in both phase and amplitude (e.g., 16-QAM, 64-QAM, or 256-QAM). Frequency modulated signals include, among others, frequency shift keying (FSK) signals such as binary frequency-shift keying (BFSK) signals, multiple frequency-shift keying (MFSK) signals, and minimum-shift keying (MSK) signals.

While some of the embodiments described herein refer to the demodulation of phase-modulated signals, it should be noted that the disclosed embodiments can also be used to demodulate frequency-modulated (FM) signals, based on the mathematical relationship between changes in frequency and changes in phase.

The polar receiver 100 includes an envelope detector 108, which operates to provide a signal representing the amplitude of the modulated radio-frequency signal. The envelope detector 108 may operate using various techniques such as, for example, signal rectification followed by low-pass filtering. The signal representing the amplitude of the modulated radio-frequency signal may be converted to a digital form with an analog-to-digital converter (ADC) 109. In some embodiments, ADC 109 samples the amplitude of the modulated radio-frequency signal at 160 Msps.

The polar receiver 100 is provided with frequency division circuitry 110. The frequency division circuitry has an input for receiving the modulated radio-frequency input signal from the low-noise amplifier 106 and a frequency-divided output for providing a frequency-divided output signal to a trigger input of a time-to-digital converter (TDC) 112. The frequency division circuitry operates to divide the frequency of the input signal by a frequency divisor. In some embodiments, as described in greater detail with respect to FIGS. 2-3, the frequency division circuitry can be implemented using a harmonic injection-locked oscillator, a digital frequency divider, or a combination thereof, among other possibilities.

The time-to-digital converter 112 operates to measure a characteristic time of the frequency-divided signal, such as the period of the frequency-divided signal. The time-to-digital converter 112 may operate to measure the period of the frequency-divided signal by measuring an elapsed time between successive corresponding features of the frequency-divided signal. For example, the time-to-digital converter may measure the period of the frequency-divided signal by measuring a time between successive rising edges of the frequency-divided signal or the time between successive falling edges of the frequency-divided signal. In alternative embodiments, the time-to-digital converter may measure a characteristic time other than a complete period, such as an elapsed time between a rising edge and a falling edge of the frequency-divided signal.

In some embodiments, the time-to-digital converter 112 operates without the use of an external trigger such as a clock signal. That is, the time-to-digital converter 112 measures the time between two features (e.g., two rising edges) of the frequency-divided signal rather than the time between an external trigger signal and a rising edge of the frequency-divided signal. Because the start and end of the time period measured by the time-to-digital converter 112 are both triggered by the frequency-divided signal, rather than an external clock signal, the time-to-digital converter 112, is referred to herein as a self-triggered time-to-digital converter.

In the example of FIG. 1, the self-triggered time-to-digital converter 112 provides a digital time output that represents the period of the frequency-divided output signal. The digital time output is provided to a digital subtractor 114. The digital subtractor 114 operates to subtract a period offset value T from the digital time output, thereby generating an offset digital time output signal. The period offset value may be a constant value corresponding to an expected period of the frequency-divided signal in an unmodulated state, which may be expressed in native units used by the time-to-digital converter. For example, where the frequency of the frequency-divided signal is expressed by fd, the period offset value T can be expressed by $$T = \frac{1}{f_d \cdot LSB}$$

where LSB is the amount of time represented by the least significant bit of the time-to-digital converter. The offset digital time output is thus at or near zero when no shift is occurring in the phase of the frequency-divided signal.

When a phase shift does occur in the modulated radio-frequency signal (i.e., a phase-modulated or frequency modulated carrier signal) this results in a temporary change in the period of the modulated radio-frequency signal, which in turn causes a temporary change in the period of the frequency-divided signal. This temporary change in the period of the frequency-divided signal is measured as a temporary change in the digital time output (and in the offset digital time output). In some embodiments, the offset digital time output is at or near zero during periods when the phase of the modulated radio-frequency signal remains steady, while a shift in the phase of the modulated radio-frequency signal results in the offset digital time output signal briefly taking on a positive or negative value, depending on the direction of the phase shift.

In some embodiments, the receiver 100 includes a digital multiplier 116. The multiplier 116 operates to multiply the offset digital time output by a scale factor K to generate a scaled digital time signal. The scale factor K may be used for example, to convert the offset digital time output signal to a scaled digital time signal that represents an angle (expressed, e.g. in radians) corresponding to a shift in the phase of the original modulated radio-frequency signal. To that end, the scale factor K may be selected as $$K = -2\pi f_c LSB$$

where $f_c$ is the frequency of the modulated radio-frequency signal (e.g, a frequency between 2412 MHz and 2484 MHz).

The offset digital time output signal (which may have been scaled in some embodiments) is provided to a digital integrator, implemented in polar receiver 100 using a digital adder 118 and a register 120. The digital integrator generates an integrated time signal. The register 120 may be clocked using the frequency-divided signal, resulting in one addition per cycle of the frequency-divided signal. In embodiments in which the offset digital time output signal represents a change in the phase of the modulated radio-frequency signal, the integrated time signal provides a value that represents the current phase of the modulated radio-frequency signal.

In polar receiver 100, the integrated time signal is sampled using a register 122, which may be clocked by a clock source 124. In some embodiments, the register 122 operates to sample the integrated time signal at 160 Msps, although other sampling rates may alternatively be used.

Alignment logic 126 is provided to provide temporal alignment between the amplitude signal from ADC 109 and the phase signal from register 122, accommodating different processing delays in the generation of the amplitude signal versus the phase signal. The aligned amplitude and phase signals are provided to coordinate rotation digital computer (CORDIC) logic circuit 128. The CORDIC logic 128 is operative to identify in-phase (I) and quadrature (Q) components corresponding to a phase-modulated radio-frequency input signal. The identified in-phase and quadrature components may be used in turn to identify a particular symbol conveyed by the phase-modulated radio-frequency input signal, such as a quadrature amplitude modulation (QAM) symbol, using conventional techniques known to those skilled in the art.

Variations on the specific receiver circuit 100 illustrated in FIG. 1 can also be implemented. For example, instead of being connected between the digital integrator and the digital subtractor, the digital multiplier 116 may be positioned after the digital integrator (118, 120) in some embodiments, reflecting the distributive property of multiplication.

Figure 2:
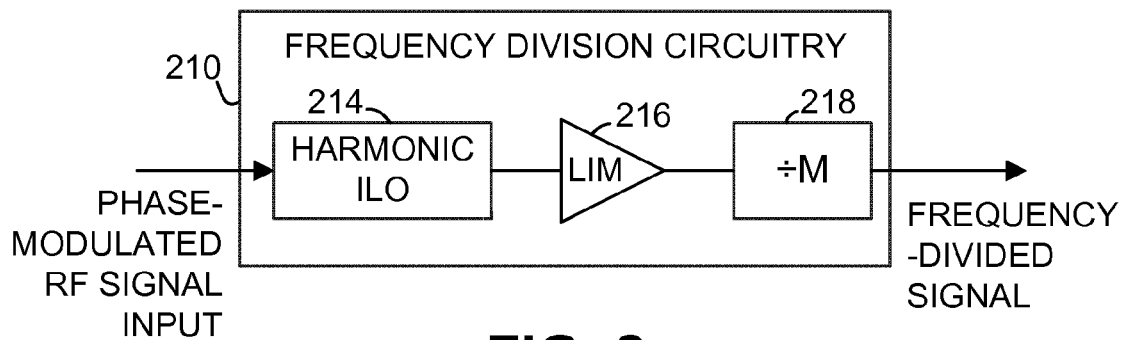
FIG. 2 is a block diagram of frequency division circuitry employed in some embodiments of a polar receiver.

While the frequency division circuitry 110 may be implemented in a variety of different ways, one exemplary structure is illustrated in FIG. 2. In the frequency division circuitry 210 of FIG. 2, a modulated radio frequency signal is provided as an input to a harmonic injection locked oscillator (ILO) 214 operating as an injection-locked frequency divider. The harmonic ILO 214 oscillates at a frequency that is a subharmonic of the modulated radio frequency signal. In some embodiments, the harmonic ILO 214 oscillates at a frequency that is one half the frequency of the modulated radio frequency input signal. The harmonic ILO operates to divide the frequency of the modulated radio frequency signal by a divisor N.

The frequency division circuitry 110 may further include a buffer 216 operating as an amplitude limiter. The limiter 216 converts a generally sinusoidal input from the harmonic ILO 214 into a generally square-wave like output that is more amenable to subsequent digital processing. The square-wave like output of the limiter 216 is then provided to a digital frequency divider 218, which may be implemented using one or more D flip-flops or using other known frequency division circuity. The digital frequency divider 218 divides the output of the limiter 216 by a divisor M to generate the frequency-divided signal that is ultimately fed to the self-triggered time-to-digital converter. The divisor M may be, for example 4. Other values may be used depending on the frequency of the modulated carrier as well as the bandwidth/speed capabilities of the time-to-digital converter. The value of the divisor may be selected in view of the carrier frequency to permit use of a power-efficient time-to-digital converter. For example, a divisor of 4 can be used with a carrier frequency of 2.4 GHz, while a divisor of 128 can be used with a carrier frequency of 60 GHz.

It should be understood that variations on the architecture illustrated in FIG. 2 may also be employed. For example, frequency division circuitry can be implemented without the use of harmonic ILO 214 or without the use of a digital frequency divider 218. However, the use of a harmonic ILO 214 provides a high amount of gain while substantially reducing the effects of amplitude modulation that might otherwise interfere with processing of the phase signal. The output of the harmonic ILO 214 provides a faithful representation of the input phase, the output phase being representable as a linear transfer function of the input phase.

Figure 3:
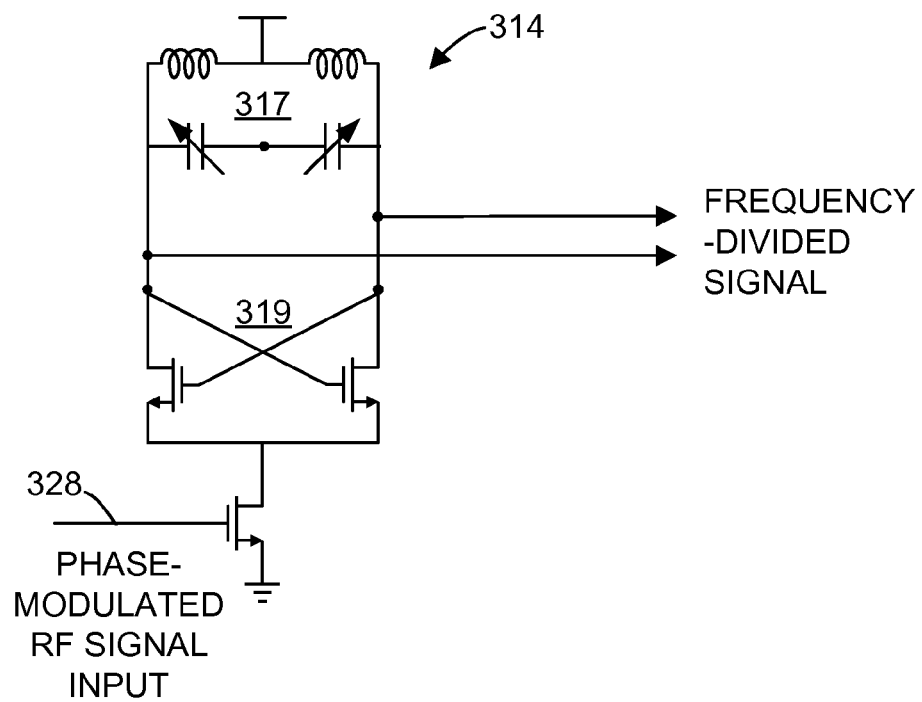
FIG. 3 is a circuit diagram of a harmonic injection-locked oscillator (ILO) employed in some embodiments of a polar receiver.

An example of a harmonic ILO used as an injection-locked frequency divider is illustrated in FIG. 3. A modulated radio-frequency signal input 328 is provided as an input to a harmonic ILO 314. The harmonic ILO 314 includes an LC tank circuit 317 driven by cross-coupled transistors 319. The LC tank circuit 317 locks on to a frequency whose second harmonic is equal to the frequency at the injection node 328. That is, the LC tank circuit 317 locks on to half of the frequency input at injection node 328. Different types of injection-locked frequency divider may be employed in other embodiments, including harmonic ILOs in which an LC tank circuit locks on to a different harmonic of the modulated radio-frequency input, such as a third or fourth harmonic.

Figure 4:
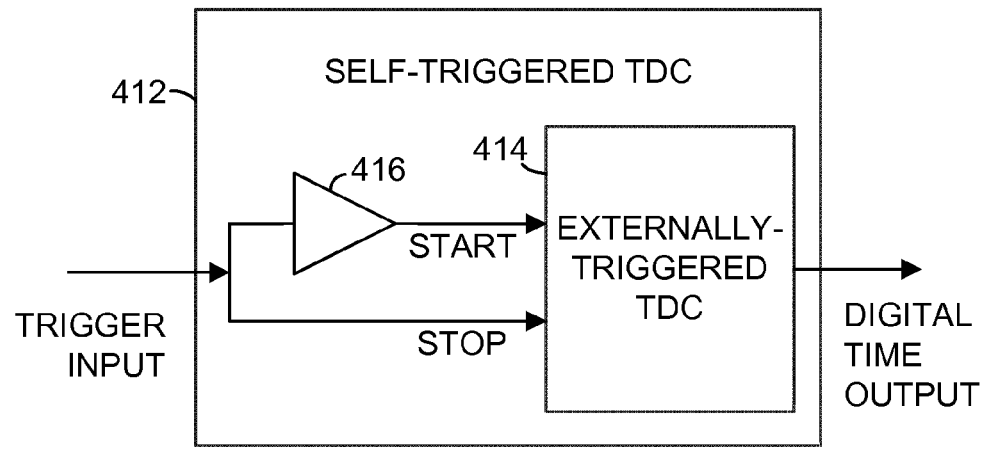
FIG. 4 is a block diagram of a self-triggered time-to-digital converter (TDC) employed in some embodiments of a polar receiver.

The self-triggered time-to-digital converter 112 of FIG. 1 may be implemented in a variety of ways. In some embodiments, as illustrated in FIG. 4, a self-triggered time-to-digital converter 412 with a single trigger input can be implemented using an externally-triggered time-to-digital converter 414. The externally-triggered time-to-digital converter 412 is operative to measure elapsed time between a rising edge of a START signal and a rising edge of a STOP signal. In the embodiment of FIG. 4, neither the START signal nor the STOP signal is provided by a clock circuit. Instead, both the START and the STOP signal are derived from the frequency-divided signal provided to the trigger input. In some embodiments, a buffer circuit 416 (which may be constructed of inverters, for example) may be provided to ensure that START and STOP signals are not simultaneous, allowing measurement of a complete period of the frequency-divided signal. Any delay in the start signal caused by buffer 416 may be accounted for in digital circuitry. For example, the period offset value T used by the digital subtractor 114 can be calibrated to accommodate any such delay.

Figure 5:
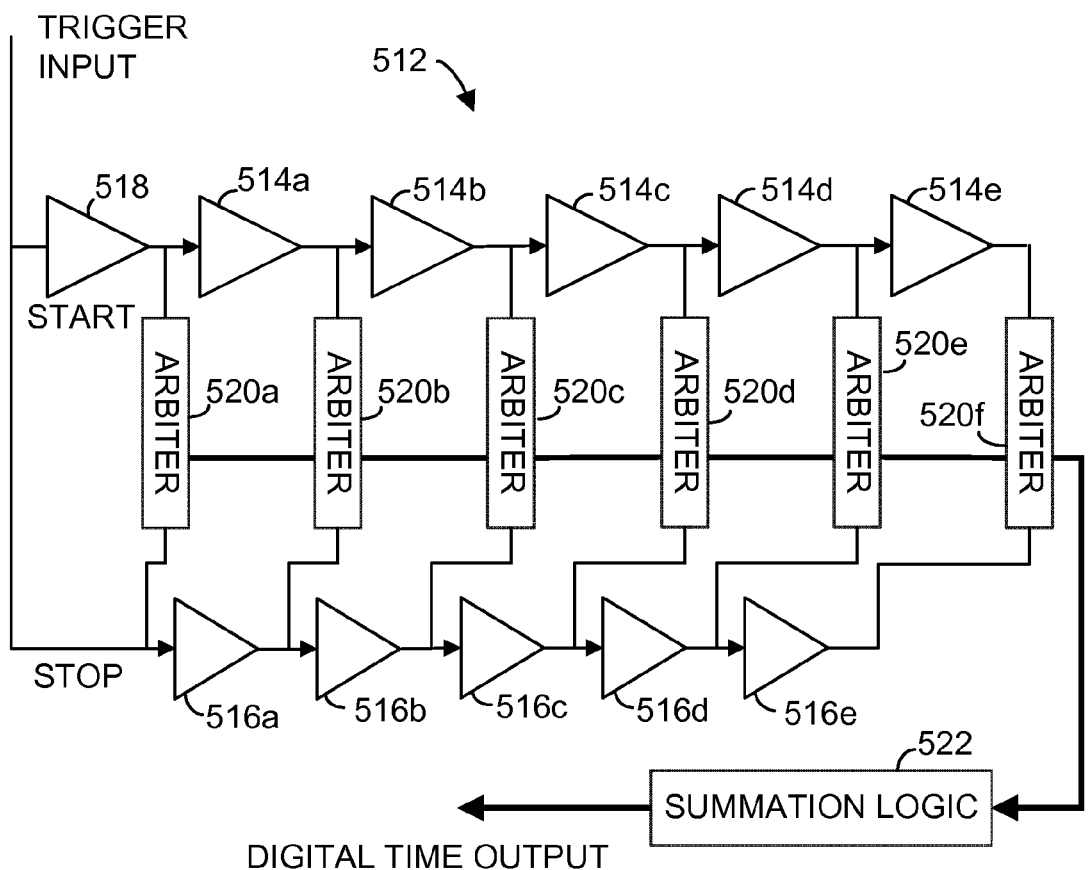
FIG. 5 is a block diagram of a Vernier time-to-digital converter (TDC) employed in some embodiments of a polar receiver.

In some embodiments, as illustrated schematically in FIG. 5, a self-triggered time-to-digital converter is implemented as a Vernier time-to-digital converter. In self-triggered Vernier time-to-digital converter 512, the frequency-divided signal is provided to a trigger input to be used as both a START signal and a STOP signal. As in the example of FIG. 4, the START signal may be delayed by a buffer 518 such that a rising edge of the START signal is not simultaneous with a rising edge of the STOP signal. The START signal propagates through a start chain of buffers 514a-e, and the STOP signal propagates through a stop chain of buffers 516a-e. The buffers 516a-e in the stop chain are designed to introduce a slightly shorter delay (e.g. to have a lower gate delay) than the buffers 514a-e in the START chain. (This feature is illustrated purely schematically in FIG. 5 by the shorter linear dimensions of the buffers 516a-e in the stop chain.) The shorter delays in the stop chain enable the later STOP signal to 'catch up' with the earlier START signal as those signals propagate through their respective inverter chains. A series of arbiter circuits 520a-f determines the point at which the rising edge of the STOP signal catches up with the rising edge of the START signal (e.g., by identifying the first arbiter circuit at which the STOP signal is HIGH when the respective arbiter is triggered by rising edge in the START signal.) A greater time interval between the START and STOP signal is reflected in a number buffers traversed before the STOP signal catches up with the START signal. In some embodiments, the use of a Vernier time-to-digital converter allows time measurement resolutions units shorter than a CMOS gate delay.

For ease of illustration, the Vernier time-to-digital converter 512 is illustrated as including only five buffers in each chain, though it should be understood that practical embodiments will generally include many more buffers (e.g., 128 or more buffers). The buffers 514a-e and 516a-e may be implemented using inverters, such as CMOS inverters, for example. The arbiters 520a-f may be implemented using D-registers or other logic elements.

In the embodiment of FIG. 5, summation logic 522 is provided to poll the arbiters 520a-f in order to generate a digital time output. For example, summation logic 522 may operate to find the number of arbiter circuits at which the STOP signal was LOW when the respective arbiter was triggered by rising edge in the START signal. Alternatively, summation logic 522 may operate to identify the first (leftmost in FIG. 5) arbiter circuits at which the STOP signal was HIGH when that arbiter was triggered by a rising edge in the START signal.

It should be noted that alternative structures can be used to implement a Vernier time-to-digital converter, and in some embodiments, time-to-digital converters other than Vernier time-to-digital converters can be used. In some embodiments, a configurable time-to-digital converter may be used, with the time-to-digital converter being configured to measure elapsed time between consecutive rising edges (or consecutive falling edges) of a single input signal.

Figure 6:
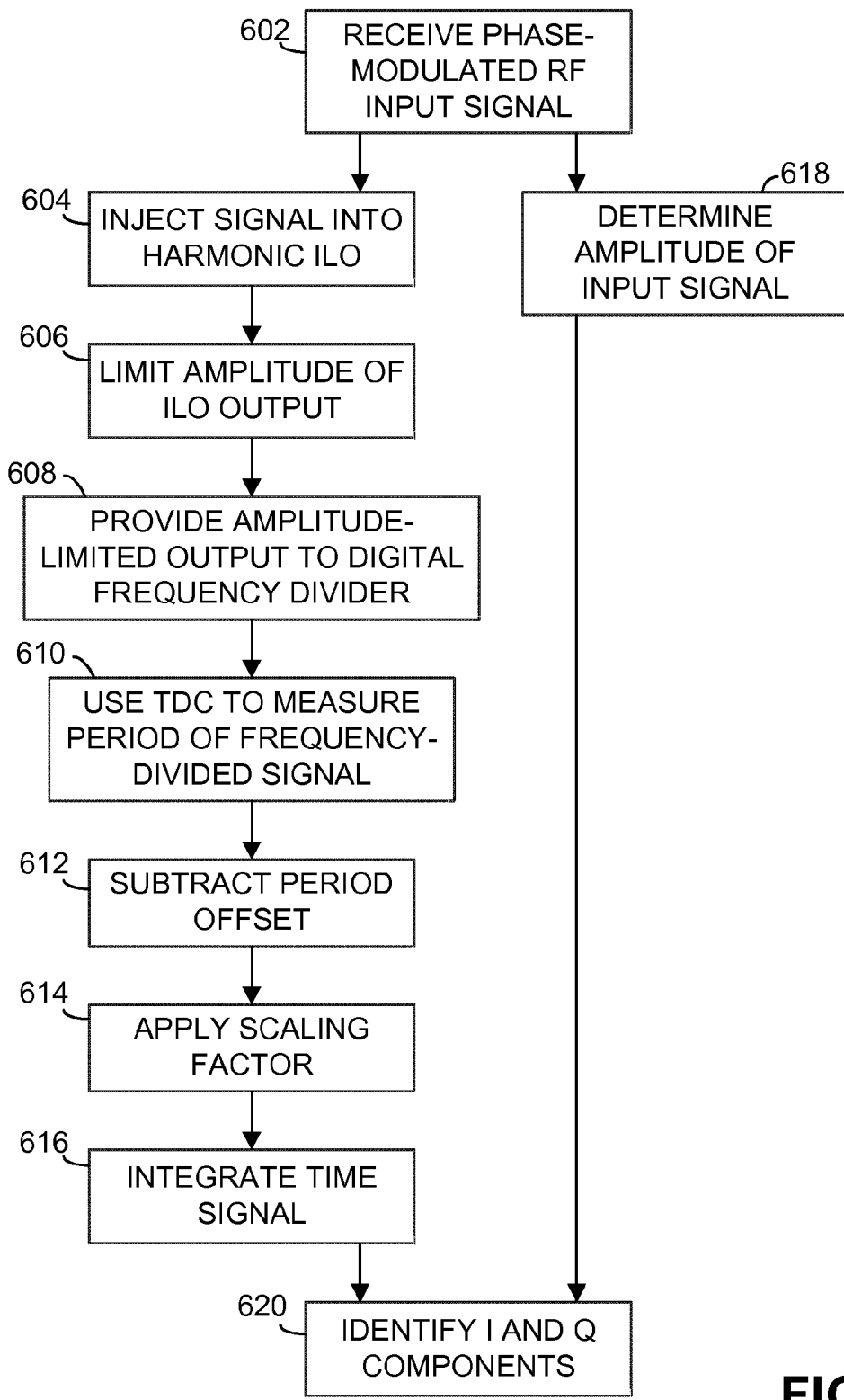
FIG. 6 is a flow chart illustrating a method performed by a polar receiver in some embodiments.

A demodulation method performed by a polar receiver is illustrated in the flow diagram of FIG. 6. In step 602, the polar receiver receives a modulated radio-frequency input signal. The frequency of the modulated radio-frequency input signal is divided as follows. In step 604, the modulated radio-frequency input signal is injected into a harmonic injection locked oscillator. The amplitude of the output of the harmonic injection-locked oscillator is limited in step 606 by providing the output of the harmonic injection-locked oscillator to an amplitude limiter. The amplitude-limited output of the harmonic injection-locked oscillator is provided in step 608 to a digital frequency divider to generate a frequency-divided signal.

In step 610, the frequency-divided signal is provided to a time-to-digital converter 610, which generates a digital time output representing a period of the frequency-divided signal. The time-to-digital converter used may be a self-triggered Vernier time-to-digital converter. In step 612, a period offset is subtracted from the digital time output to generate an offset digital time output. In step 614, the offset digital time output is scaled using a digital multiplier to multiply the offset digital time output by a scaling factor. In step 616, the offset digital time output is integrated to generate an integrated time signal. The integrated time signal provides a digital representation of the phase of the radio-frequency input signal.

In addition to the steps used to determine the phase of the radio-frequency input signal, one or more additional steps 618 may be used to determine the amplitude of the radio-frequency input signal. These steps may include, for example, signal rectification followed by low-pass filtering and analog-to-digital conversion.

In some embodiments, based on digital signals representing the phase and amplitude of the radio-frequency input signal, the polar receiver operates in step 620 using CORDIC logic to identify in-phase (I) and quadrature (Q) components of a quadrature amplitude modulation (QAM) symbol.

In the foregoing specification, specific embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A receiver comprising:
   a low-noise amplifier (LNA) operative to amplify a received modulated radio-frequency input signal;
   frequency division circuitry connected to the LNA and having an input for receiving the amplified modulated radio-frequency input signal and a frequency-divided output for providing a frequency-divided output signal;
   a self-triggered time-to-digital converter (TDC) having a trigger input in communication with the frequency-divided output and a digital time output representing a period of the frequency-divided output signal;
   a digital subtractor operative to subtract a period offset from the digital time output to generate an offset digital time output;

a digital integrator in communication with the digital subtractor and operative to generate an integrated time signal representing a phase of the radio-frequency input signal.

2. The receiver of claim 1, wherein the time-to-digital converter (TDC) is a Vernier TDC.

3. The receiver of claim 1, further comprising a digital multiplier connected between the digital integrator and the digital subtractor.

4. The receiver of claim 1, wherein the frequency division circuitry includes:
a harmonic injection locked oscillator (ILO) having an input for receiving the amplified radio-frequency signal; and
a limiter operative to limit an amplitude of an output of the harmonic injection locked oscillator.

5. The receiver of claim 4, wherein the frequency division circuitry further includes a digital frequency divider connected to an output of the limiter.

6. The receiver of claim 1, further comprising:
an envelope detector operative to determine an amplitude of the modulated radio-frequency input signal; and
coordinate rotation digital computer (CORDIC) logic operative to identify in-phase (I) and quadrature (Q) components of the modulated radio-frequency input signal from the amplitude and phase of the modulated radio-frequency input signal.

7. A receiver comprising:
a harmonic injection-locked oscillator having an input for receiving a modulated radio-frequency input signal and a frequency-divided output for providing a frequency-divided output signal;
a time-to-digital converter (TDC) having a trigger input in communication with the frequency-divided output and a digital time output representing a period of the frequency-divided output signal;
a digital subtractor operative to subtract a period offset from the digital time output to generate an offset digital time output;
a digital integrator in communication with the digital subtractor and operative to generate an integrated time signal representing a phase of the radio-frequency input signal.

8. The receiver of claim 7, further comprising a limiter operative to limit an amplitude of the frequency-divided output.

9. The receiver of claim 8, wherein the frequency division circuitry further includes a digital frequency divider connected to an output of the limiter.

10. The receiver of claim 7, further comprising a low-noise amplifier operative to amplify the modulated radio-frequency input signal provided to the harmonic injection-locked oscillator.

11. The receiver of claim 7, wherein the time-to-digital converter is a Vernier time-to-digital converter.

12. The receiver of claim 7, further comprising a digital multiplier connected between the digital integrator and the digital subtractor.

13. A demodulation method comprising:
receiving a modulated radio-frequency input signal;
dividing the frequency of the radio-frequency input signal using a harmonic injection locked oscillator to generate a frequency-divided signal;
providing the frequency-divided signal to a self-triggered time-to-digital converter (TDC) to obtain a digital time output representing a period of the frequency-divided signal;
subtracting a period offset from the digital time output to generate an offset digital time output; and
integrating the offset digital time output to generate an integrated time signal representing the phase of the radio-frequency input signal.

14. The method of claim 13, wherein dividing the frequency further includes:
limiting an amplitude of an output of the harmonic injection-locked oscillator; and
providing the amplitude-limited output of the harmonic injection-locked oscillator to a digital frequency divider.

15. The method of claim 13, further comprising scaling the offset digital time output.

16. The method of claim 13, wherein the self-triggered time-to-digital converter is a Vernier time-to-digital converter.

17. The method of claim 13, further comprising:
determining an amplitude of the modulated radio-frequency input signal; and
identifying in-phase (I) and quadrature (Q) components of the phase-modulated radio-frequency input signal from the amplitude and phase of the phase-modulated radio-frequency input signal.

18. A receiver comprising:
frequency division circuitry having an input for receiving a modulated radio-frequency input signal and a frequency-divided output for providing a frequency-divided output signal;
a self-triggered time-to-digital converter (TDC) having a trigger input in communication with the frequency-divided output and a digital time output representing a period of the frequency-divided output signal;
a digital subtractor operative to subtract a period offset from the digital time output to generate an offset digital time output;
a digital multiplier connected to the digital subtractor, the digital multiplier being configured to scale the offset digital time output; and,
a digital integrator in communication with the digital multiplier and operative to generate an integrated time signal representing a phase of the radio-frequency input signal.

19. A receiver comprising:
a harmonic injection locked oscillator (ILO) having an input for receiving a modulated radio-frequency input signal and having a frequency-divided output for providing a frequency-divided output signal;
a limiter operative to limit an amplitude of the frequency-divided output signal;
a self-triggered time-to-digital converter (TDC) having a trigger input in communication with the frequency-divided output and a digital time output representing a period of the frequency-divided output signal;
a digital subtractor operative to subtract a period offset from the digital time output to generate an offset digital time output; and
a digital integrator in communication with the digital subtractor and operative to generate an integrated time signal representing a phase of the radio-frequency input signal.

20. The receiver of claim 19, wherein the frequency division circuitry further includes a digital frequency divider connected to an output of the limiter.

21. A receiver comprising:
frequency division circuitry having an input for receiving a modulated radio-frequency input signal and a frequency-divided output for providing a frequency-divided output signal;
a self-triggered time-to-digital converter (TDC) having a trigger input in communication with the frequency-divided output and a digital time output representing a period of the frequency-divided output signal;
a digital subtractor operative to subtract a period offset from the digital time output to generate an offset digital time output;
a digital integrator in communication with the digital subtractor and operative to generate an integrated time signal representing a phase of the radio-frequency input signal;
an envelope detector operative to determine an amplitude of the modulated radio-frequency input signal; and
coordinate rotation digital computer (CORDIC) logic operative to identify in-phase (I) and quadrature (Q) components of the modulated radio-frequency input signal from the amplitude and phase of the modulated radio-frequency input signal.

22. A demodulation method comprising:
receiving a modulated radio-frequency input signal;
dividing the frequency of the radio-frequency input signal to generate a frequency-divided signal;
providing the frequency-divided signal to a self-triggered time-to-digital converter (TDC) to obtain a digital time output representing a period of the frequency-divided signal;
subtracting a period offset from the digital time output to generate an offset digital time output; and
scaling the offset digital time output;
integrating the scaled offset digital time output to generate an integrated time signal representing the phase of the radio-frequency input signal.

* * * * *